ORTHODONTIC BAND FORMING PLIER

Filed Sept. 19, 1955 2 Sheets-Sheet 1

INVENTOR.
JOSEPH D. PEAK
BY
McGrew & Edwards
ATTORNEYS

Oct. 4, 1960 J. D. PEAK 2,954,606
ORTHODONTIC BAND FORMING PLIER
Filed Sept. 19, 1955 2 Sheets-Sheet 2
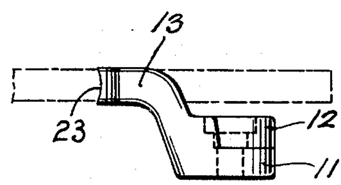
Fig. 4.
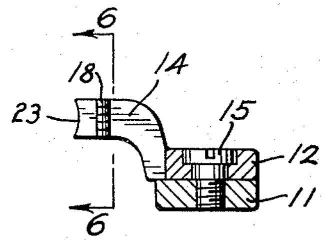
Fig. 5.
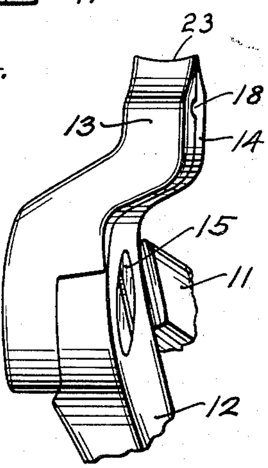
Fig. 10.
18
19
14
Fig. 6.
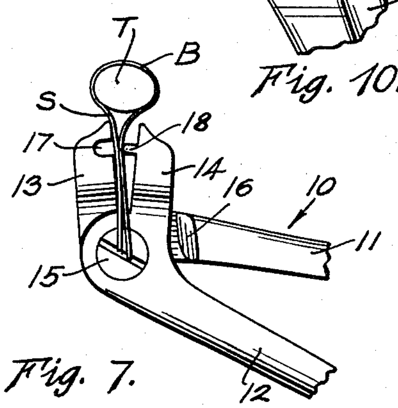
Fig. 7.
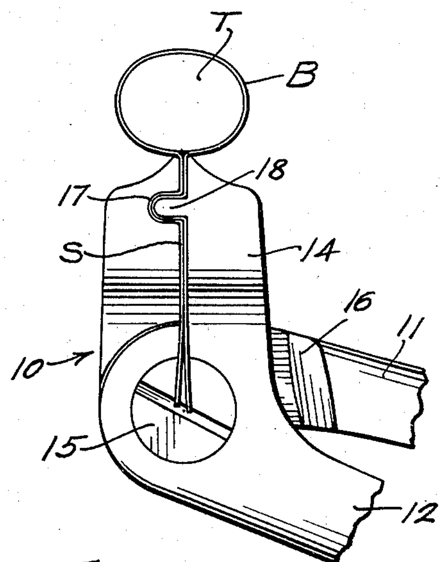
Fig. 8.
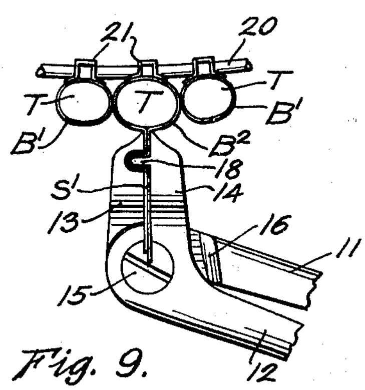
Fig. 9.
INVENTOR.
JOSEPH D. PEAK
BY
McGrew & Edwards
ATTORNEYS 2,954,606
Patented Oct. 4, 1960

2,954,606

ORTHODONTIC BAND FORMING PLIER

Joseph D. Peak, Austin, Tex., assignor to Rocky Mountain Metal Products Co., Denver, Colo., a corporation of Colorado Filed Sept. 19, 1955, Ser. No. 534,984

5 Claims. (Cl. 32—66)

The present invention relates to an orthodontic band forming plier. It has to do with an improved dental plier for use in measuring and fitting orthodontic bands on teeth to correct the position of malposed teeth of the dental arch, for splinting teeth, and also for the fabrication of space-maintaining means.

One of the objects of the present invention is to provide a plier as aforesaid whose gripping jaws are so constructed and arranged as to permit the plier to be used on either the lingual or the buccal surface of any tooth in the mouth; another object being to provide an improved plier which may be made either right-hand or left-hand to permit it to be applied to any tooth in the dental arch.

Another object of the invention is to provide an improved plier for use with an orthodontic band to form the band from a flat strip of material and cause it to be stretched around the tooth; another object being to provide an improved plier for use in the mouth of a patient with a strip of band material to which a bracket or brackets and other attachments have been prefixed, to form and fit the band to the tooth.

A further object of the invention is to provide an improved plier having means embodied therein to predetermine the amount of stretch to which the band of material is subjected while forming the band around a tooth.

The foregoing and other objects and advantages of the invention will appear from the following description and appended claims when considered in conjunction with the accompanying drawings wherein like reference characters designate corresponding parts in the several views.

In said drawings:

Fig. 4 is a fragmentary detail looking in the direction of the arrow of Fig. 3.

Fig. 5 is a sectional view taken substantially along the line 5—5 of Fig. 2, looking in the direction of the arrows.

Fig. 6 is an enlarged fragmentary detail sectional view taken substantially along the line 6—6 of Fig. 5, looking in the direction of the arrows.

Fig. 7 is a fragmentary top plan view of the plier, shown in association with a strip of band material and prior to tightening the band around a tooth.

Fig. 8 is a view similar to Fig. 7 but on an enlarged scale and showing the plier and band after being stretched and tightened around the tooth by the plier.

Fig. 9 is a fragmentary plan view of the plier of the preceding views, illustrating another technique or use thereof; and Fig. 10 is a front edge detail perspective view of the nose of the plier showing the offset jaws.

Before explaining in detail the present invention it is to be understood that the invention is not limited in its application to the details of construction and arrangement of parts illustrated in the accompanying drawings, since the invention is capable of other embodiments and of being practiced or carried out in various ways. It is to be understood also that the phraseology or terminology employed herein is for the purpose of description and not of limitation, and it is not intended to limit the invention claimed herein beyond the requirements of the prior art.

Figure 1:
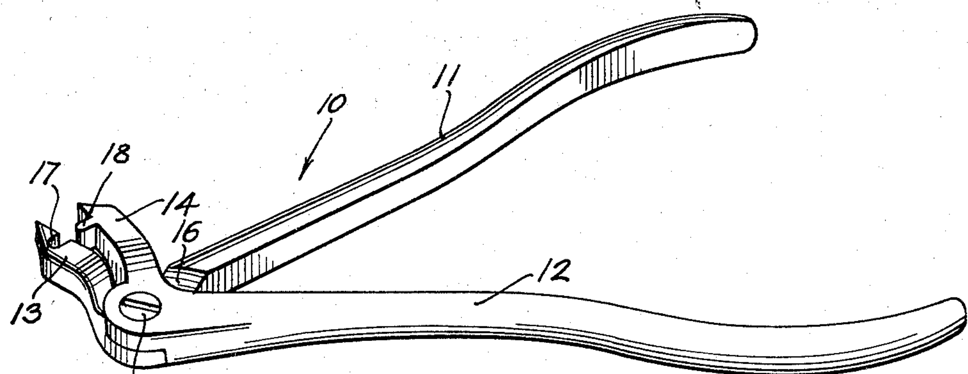
Fig. 1 is a perspective view of the plier of the present invention, with the jaws partially open.
Figure 2:
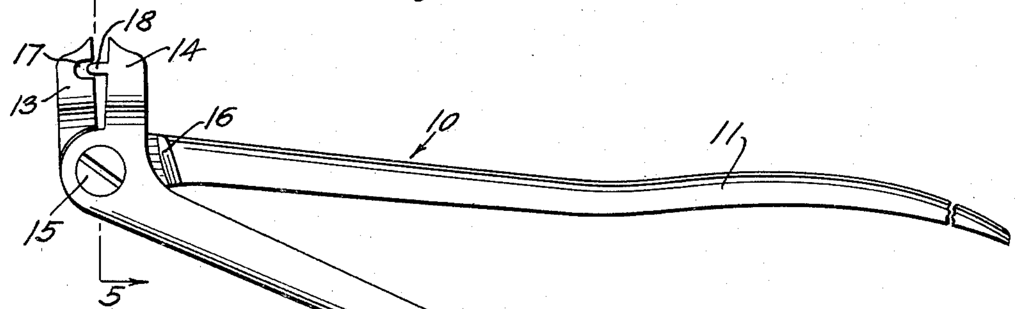
Fig. 2 is a top plan view of the plier of Fig. 1.
Figure 3:
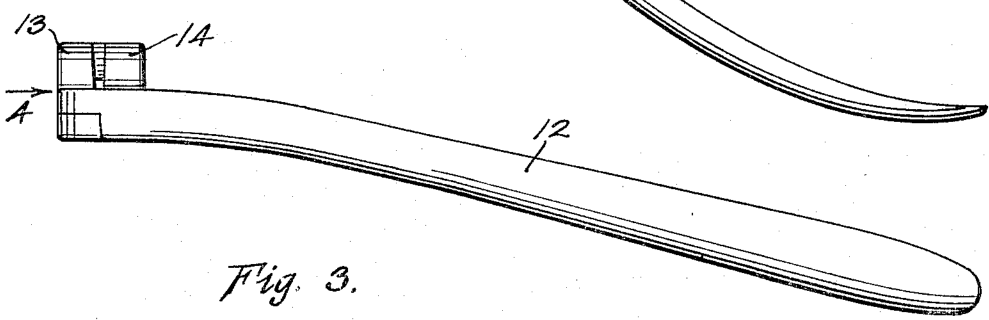
Fig. 3 is a side edge view of the plier.

Referring now to the drawings, there is shown therein one embodiment of plier of the present invention, being indicated as a whole at 10. As shown, the plier comprises a pair of band clamping handles 11 and 12 carried by and projecting, respectively, from cooperating pivotally connected jaws 13 and 14. The enlarged portions of the handles from which the cooperable jaws project are pivotally or hingedly connected together by a suitable pivot member, such as a shoulder screw 15. The head portion of the screw is countersunk in the enlarged portion of handle 12, see particularly Figs. 1, 2, and 5. To prevent the jaws from being opened beyond a predetermined point, handle member 11 is preferably provided with a shoulder or abutment 16, see especially Figs. 2, 7, 8, and 9, which will be engaged by the adjacent portion of jaw 14 and act as a stop to prevent too wide opening of the jaws.

Jaw 13 is provided with a transversely extending socket, groove, or depression 17 which is generally U-shaped in cross section. The inner face or surface of jaw 14 is provided with a mating or cooperating transversely extending projection or tongue 18 whose lead edge is grooved, corrugated, or knurled, as shown at 19, see particularly Figs. 5 and 6. The purpose of the knurled lead edge of surface 19 is to provide a friction contact with a portion of the material of the strip to prevent it from slipping in the use of the plier in the operation of forming a band around a tooth.

With particular reference to Figs. 7 and 8 of the drawings, two positions of the jaws of the plier with relation to a strip of metal or other material are shown in the course of forming a band B from the strip of material S around a tooth T, this operation taking place in the patient's mouth. The strip of material S is bent or wrapped around tooth T with the two free ends thereof being passed into position between the jaws 13 and 14. The handles of these respective jaws are then moved toward each other to move the projecting tongue 18 into contact with the material of the strip and force it into the groove or socket 17 until it forms a band of the shape of that seen in Fig. 8. The tongue or projection 18 serves to stretch the material of the strip to cause the band to make a snug fit around the tooth. The tightening and conforming of the band is assisted materially because of the roughened or knurled surface 19 on the lead portion of tongue 18. The plier exerts sufficient pressure to stretch and contour the flat strip of band material to the exact contour and shape of the tooth being measured. Contour fitting to the side of a tooth is aided by the concave surface or depression 23 at the outer ends of each of the band clamping jaws. The time required to measure a band is much shorter than with other conventional methods and instruments.

The offset "beak," namely the cooperating jaws 13 and 14 of the plier, enables the strip S of band material to feed through regardless of the length of the strip or the size of the tooth to be measured. This offset "beak" also enables the plier to be applied directly to the lingual surface of any tooth in the arch, right or left.

It is to be understood that when the jaws close together, the tongue 18 and groove 17 engage and take up the slack in the strip of material S and finally stretch the flat strip of band material around the tooth. The depth of the tongue and groove may be varied since that depth determines the amount of stretch placed on the strip of material.

After the band has been formed as shown at B in Fig. 8, the band following the contour of the tooth T in that view, it may be cut and its abutting ends fixed together in conventional manner and by conventional means.

With particular reference to Fig. 9, there is shown another manner of using the plier of the present invention, thereby illustrating a somewhat different technique. In that view, 20 represents an arch wire and 21, several brackets carried by the arch wire and which have been prefixed to several strips of band material, similar to the strip S of Figs. 7 and 8. In accordance with the showing in Fig. 9, the two outermost bands B′ and B′ have been formed in accordance with the disclosure in Figs. 7 and 8 and the central band $B^2$ is in the course of being formed by the plier. The original strip or length of band material S′ shown in this view and to which a bracket 21 has been prefixed, is passed in between the jaws 13 and 14 of the plier, whereupon the handles thereof are brought together to force the tongue or projection 18 of the plier into the cooperating groove 17 of jaw 13 so as to stretch the band material and cause it to conform to the tooth T. After the band has been so shaped about the center tooth illustrated, the ends thereof are cut off and the adjacent ends are secured together in conventional manner and by conventional means.

By virtue of the improved plier, no special ability or skill in measuring a close, well adapted band to a tooth, is required. If desirable, a strip of chrome alloy or precious metal may be used and no special contouring or fabrication is required before being applied to a tooth. Moreover, the use of the plier in connection with multiple band technique is economical and time saving.

I claim:

1. An orthodontic band forming plier comprising a pair of handles extending outwardly from a pivot and in substantially a single plane, a band clamping jaw extending outwardly from each handle beyond said pivot and arranged to open when said handles are opened and close when said handles are closed, each jaw extending laterally from a general longitudinal axis through its handle at an acute angle, the ends of said jaws being in a different plane than the handle, and band stretching means on ends of said jaws, inclusive of a tongue in one jaw and a co-acting groove in the other for stretching a band around a tooth when said jaws are moved together.

2. An orthodontic band forming plier according to claim 1 in which the jaws are laterally and outwardly extended beyond the pivotal axis of the handles so as to lie in a plane substantially parallel to the plane of said handles.

3. An orthodontic band forming plier according to claim 1 wherein the tongue and groove members are disposed inwardly from and adjacent to the ends of said jaws.

4. An orthodontic band forming plier according to claim 1 in which the holding surfaces of said tongue and groove portions are knurled to prevent slippage of a band held therebetween.

5. An orthodontic band forming plier as defined in claim 1 wherein each of the band clamping jaws has a concave surface at its outer end for shaping the band to a tooth during use.

References Cited in the file of this patent

UNITED STATES PATENTS

| | | |
|---|---|---|
| 1,034,591 | Douds | Aug. 6, 1912 |
| 1,438,975 | Wiggins | Dec. 19, 1922 |
| 1,594,143 | Angle et al. | July 27, 1926 |
| 2,375,094 | Flanagan | May 1, 1945 |
| 2,698,483 | Berkowitz | Jan. 4, 1955 |